April 5, 1927.
W. M. SHEWRY
COASTER WAGON
Filed Oct. 26, 1925
1,623,443
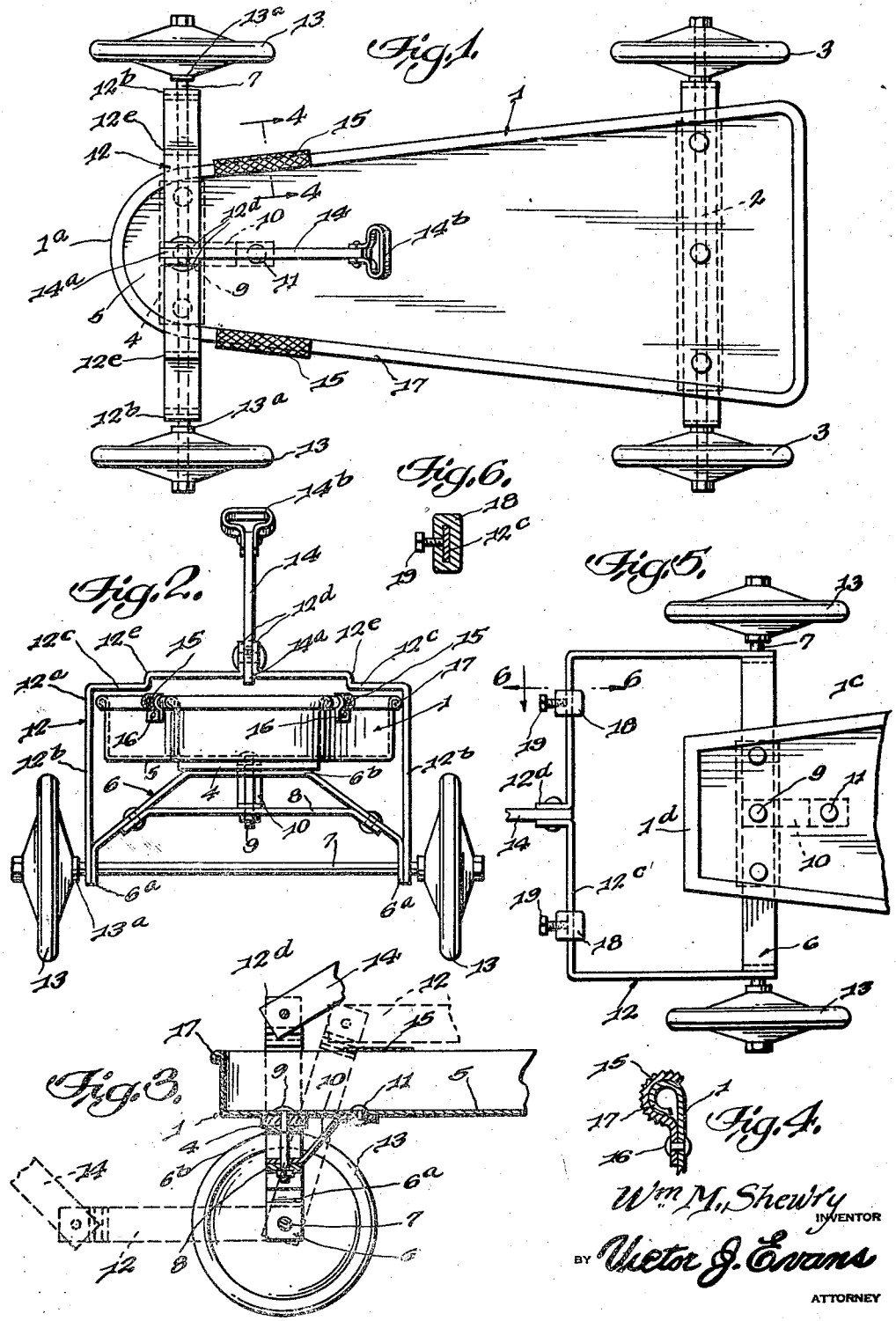
Wm M. Shewry
INVENTOR
BY Victor J. Evans
ATTORNEY Patented Apr. 5, 1927.

1,623,443

UNITED STATES PATENT OFFICE.

WILLIAM M. SHEWRY, OF CHICAGO, ILLINOIS.

COASTER WAGON.

Application filed October 26, 1925. Serial No. 64,962.

This invention relates to wagon construction, and more particularly to what is known as a coaster wagon.

One of the main objects of the invention is to provide a wagon of this type of simple and inexpensive and of very strong and durable construction which will present a neat appearance. A further object is to provide improved means for steering the wagon in conjunction with means for locking the front wheels of the wagon in a straightforward position for coasting. Another object is to provide an improved front gear for a wagon of this type which will render it non-tipping. Further objects will appear from the detailed description.

In the drawings:

Figure 1 is a top plan view of the wagon,

Figure 2 is a front view,

Figure 3 is a vertical central section taken longitudinally through the front part of the wagon.

Figure 4 is a fragmentary section through the side portion of the wagon body and one of the locking members, taken on line 4—4 of Fig. 1.

Fig. 5 is a plan view of the forward portion of a wagon showing a modified form of the invention.

Fig. 6 is a section taken on line 6—6 of Fig. 5.

The wagon can be constructed of sheet metal, wood, or any other suitable or preferred material, as will be understood. In the particular form illustrated in Fig. 1, the body 1 is constructed of sheet metal and is of approximately U-shape in plan view, tapering from the front to the rear. The rearward portion of the body is supported by means of a rear axle 2 and wheels 3 mounted thereon, and associated means, the axle being secured to the body of the wagon in a known manner. Adjacent the front end of body 1 I provide a block 4 of wood or other suitable material positioned beneath the bottom 5 of the body and secured thereto in any suitable manner. The front gear includes a frame 6 of approximately inverted U-shape, the lower portions $6^a$ of the arms of which are disposed vertically and fit about front axle 7. The arms of frame 6 are held in spaced relation by a brace strip 8 secured to the arms and disposed in parallelism with bight portion $6^b$ of the frame. A king bolt 9 passes through the bottom 5 of body 1 and through block 4. This bolt also passes through the bight portion $6^b$ of frame 6 and through the brace strip 8. The bolt 9 also passes through the forward end of a brace bracket 10 which is inclined downwardly and forwardly of the body and has its forward portion fitting flatly upon the upper face of strip 8, this bracket being secured at its upper rearward end to bottom 5 of body 1 by rivet 11 or in any other suitable or preferred manner. This provides a light but very rigid and durable front gear construction for supporting the front of the wagon while permitting ready turning of the frame 6 about king bolt 9 for steering purposes.

For steering the wagon I provide a bow 12 of rectangular shape the lower end of the arms $12^b$ of members $12^a$ of this bow receiving axle 7 and being confined between elements $6^a$ of frame 6 and hubs $13^a$ of wheels 13 which are mounted on the end portions of axle 7 in a known manner. While I have illustrated wheels 13 and 3 as of disc construction any other suitable or preferred type of wheel can be employed, as will be understood. The upper or outer arms $12^c$ of members $12^a$ are bent at right angles at their outer ends to provide extensions or fingers $12^d$. These fingers $12^d$ are disposed in parallelism and receive between them a flattened element or head $14^a$ provided at the outer end of a handle bar 14 having secured to its inner or free end a gripping member or handle $14^b$. The head $14^a$ is pivotally secured between fingers $12^d$ by means of a rivet or equivalent member secured through the head and fingers $12^d$. As will be noted more clearly from Figure 1 the rounded front portion $1^a$ of body 1 is concentric with the king bolt 9 and the wheels are disposed beyond the sides of the body, this arrangement permitting ready turning of the frame 6 and the bars carried thereby about the king bolt in either direction and through a comparatively great distance for steering purposes. As the bow 12 extends about the body of the wagon the bar 14 can be held at right angles to the bow when seated in the wagon, thus providing a great leverage effect for steering purposes due to the fact that the arms $12^a$ of the bow 12 are connected to the shaft 7 closely adjacent the ends thereof. This renders it possible to readily steer the wagon with very little effort. When coasting, bow 12 may be pulled rearwardly by means of bar 14 so as to force shoulders $12^e$ of arms $12^c$ into locking engagement with the lateral walls of body 1. This locks the axle 7 in position transversely of the body, with the wheels 13 directly forwardly, thus avoiding the necessity for steering and relieving the rider of the strain of trying to keep the wheels in a straightforward position when coasting straight ahead. When coasting on a turn, the front axle can be locked to a certain extent in the same manner but, in this instance, one of the shoulders 12$^e$ only will contact with the wagon. The axle can be readily released for steering purposes at any time by forcing the bow 12 forwardly out of engagement with the side walls of the body by means of bar 14. In this connection it is to be noted that the arms 12$^b$ are of such length that shoulders 12$^e$ are positioned above the upper edges of the side walls of the body when the bow is in vertical position, as illustrated in Figure 2. This permits ready steering of the wagon in the manner previously described. Preferably, though not necessarily, I provide locking plates 15 which are secured to the side walls 1$^b$ of body 1 by rivets 16 or in any other suitable manner. These plates are shaped to fit about a bead 17 formed at the upper edge of the vertical wall of body 1 and have their outer surfaces roughened or knurled so as to exert a better gripping and locking effect upon shoulders 12$^e$ of arms 12$^c$. A wagon constructed in this manner is of light weight and possesses great strength and durability and is particularly well adapted for use by a young boy for coasting and other purposes.

In the modified form illustrated in Figure 5 I have shown a wooden body 1$^c$ having a square or straight front end 1$^d$. In this form arms 12$^{c'}$ of the bow 12 are straight and two sleeves 18 are mounted on these arms and secured thereon by set screws 19. These sleeves are so positioned that, when bow 12 is moved rearwardly beyond vertical position the inner ends of the sleeves will contact with the side walls of body 1$^c$ at the upper edges thereof thus locking the front axle in adjustment about the king bolt 9. If desired, the sleeves 18 can be substituted for shoulders 12$^e$ in the form of wagon illustrated in Figures 1–3. In either case, the operation of the wagon is practically the same and the bow can be quickly and securely locked so as to hold the front axle in adjustment, and when the bow is released, the handle bar 14 and the bow provide simple and highly efficient means for steering the wagon.

As will be understood, and as above indicated, changes in the details of construction and arrangement of parts of the invention may be restored to without departing from the field and scope of the same, and I intend to include all such variations, as fall within the scope of the appended claims, in this application, in which a preferred form only of my invention is disclosed.

What I claim is:

1. In a wagon of the character stated, a body, a rear axle and wheels mounted thereon supporting the rearward portion of the body, a front axle connected to the forward portion of the body for turning movement, wheels mounted on the front axle, a bow having its arms connected to the front axle on opposite sides of and remote from the center thereof, the arms of the bow being movable about the axle and said bow being adapted to extend upwardly over and about the forward portion of the body, and a steering handle pivotally secured to the central portion of the bow.

2. In a wagon of the character stated, a body adapted for use as a seat when coasting, a rear axle and wheels mounted thereon supporting the rearward portion of the body, a front axle connected to the forward portion of the body for turning movement about a vertical axis at the transverse center of the forward portion of the body, wheels mounted on the front axle adjacent the ends thereof, and a bow having its arms mounted on the front axle at opposite sides of and remote from the axis of turning movement of said front axle, the bow being freely movable about the front axle and of a height and width to extend over and about the forward portion of the body when the bow is in raised position, the width of the bow being sufficiently greater than the width of the forward portion of the body to permit turning of the front axle by means of the bow when it is in raised position for steering purposes.

3. In a wagon of the character stated, a rearwardly tapering body, a rear axle and wheels thereon supporting the rearward portion of the body, a front axle connected to the forward portion of the body for turning movement for steering purposes, wheels mounted on the ends of the front axle, a bow having the ends of its arms attached to the front axle adjacent the wheels thereof and freely movable about the axle, the bow being of greater width than the front portion of the body and of a height to extend above the body, and a steering bar pivotally secured to the central portion of the bow.

4. In a wagon of the character stated, a rearwardly tapering body, a rear axle and wheels thereon supporting the rearward portion of the body, a front axle connected to the forward portion of the body for turning movement for steering purposes, wheels mounted on the ends of the front axle, a bow having the ends of its arms attached to the front axle adjacent the wheels thereof, the bow being of greater width than the front of the body and of a height to extend above the body, a steering bar pivotally secured to the central portion of the bow, and elements carried by the lateral walls of the body and disposed for locking engagement with the arms of the bow when the bow is moved into its rearmost position.

5. In a wagon of the character stated, a body, a rear axle and wheels mounted thereon supporting the rearward portion of the body, a front gear frame of approximately inverted U-shape pivotally secured to the forward portion of the body for turning movement for steering purposes, a front axle carried by said frame, wheels mounted on the ends of the front axle, a steering bow having its arms attached to the front axle and confined between the arms of said frame and the wheels, the arms of the bow being movable about the axle and the bow being adapted to extend upwardly about and over the forward portion of the body, and a steering bar pivotally secured to the central portion of the bow.

6. In a wagon of the character stated, a wagon body provided with a bearing member on the under face of its forward portion, a front gear frame of approximately inverted U-shape having a flattened bight portion contacting with the bearing member, a brace strip connecting the arms of said frame, a brace bracket secured to the bottom of the body having its forward portion disposed closely adjacent the brace strip, a king bolt passing through the bottom of the body and through the bight portion and the brace strip of the frame and through the forward portion of the brace bracket, an axle carried by the gear frame, wheels mounted on the ends of the axle, a steering bow having its arms attached to the axle and confined between said wheels and the arms of the gear frame, said bow being adapted to extend about and above the forward portion of the wagon body, and a steering bar pivotally secured to the central portion of the bow.

In testimony whereof I affix my signature.

WILLIAM M. SHEWRY.